United States Patent Office 3,537,241
Patented Nov. 3, 1970

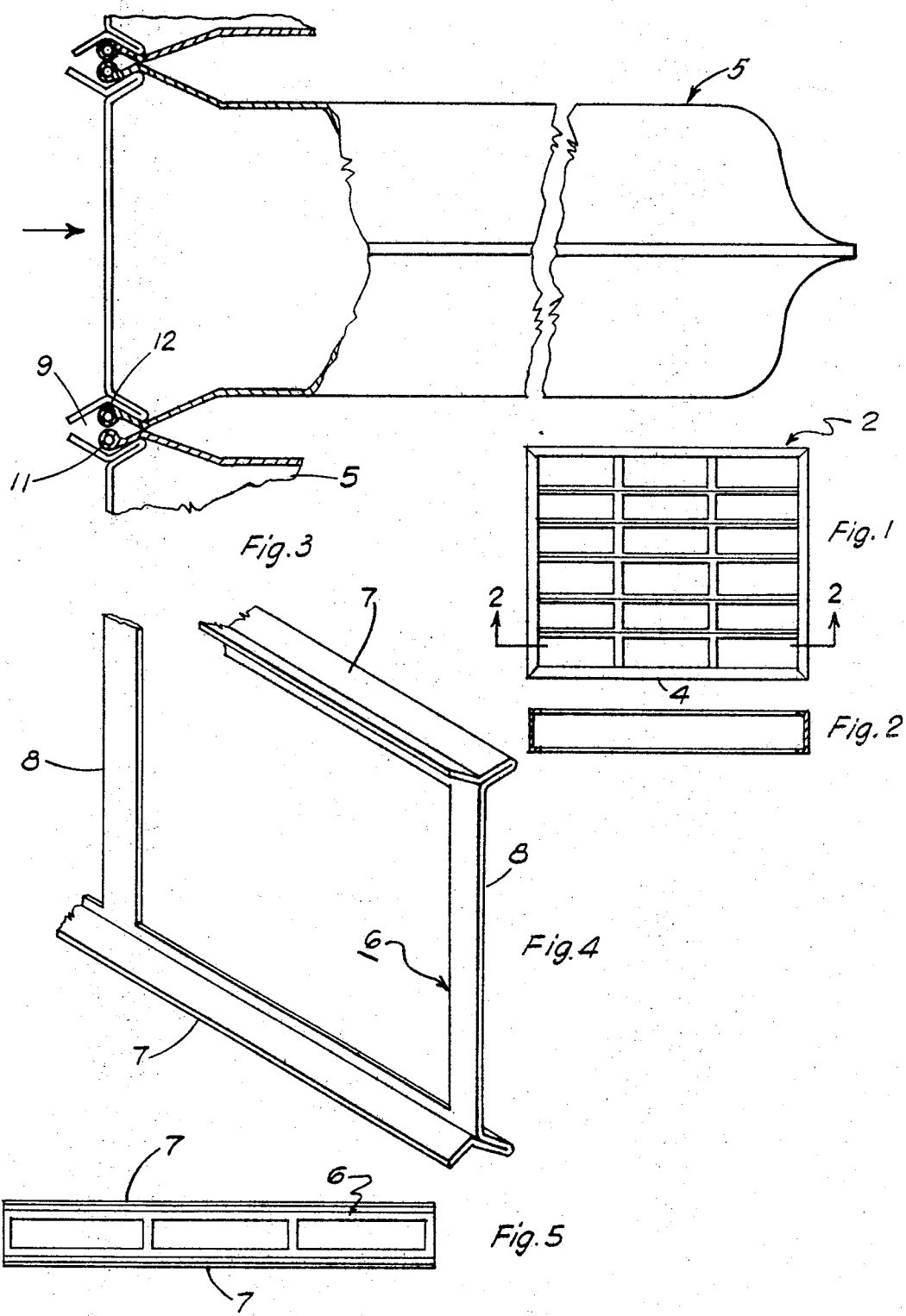

3,537,241
GAS FILTER BAG STRUCTURE
John W. Wiegel, Louisville, and Paul L. Brooks, Waddy, Ky., assignors to American Air Filter Company, Inc., Louisville, Ky., a corporation of Delaware
Filed Apr. 21, 1969, Ser. No. 817,726
Int. Cl. B01d 46/02
U.S. Cl. 55—378                                      2 Claims

ABSTRACT OF THE DISCLOSURE

An improved gas filter bag structure comprising a plurality of side-by-side filter bags, each having its mouth portion held in open position by a rigid mouth-shaping member, the opposite extremities of the mouth portions of the filter bags being inserted in a channel-shaped flow-through border frame sized to hold the mouth portions of the filter bags in fast side-by-side relation to grip such mouth portions therebetween, the sides of the rigid mouth-shaping members being of concave cross-sectional configuration so that adjacent mirror-image sides thereof provide pockets therebetween to receive the mouth portions for support.

BACKGROUND OF THE INVENTION

The present invention relates to an improved filter apparatus for gas separation, and more particularly, to an improved mouth-shaping structure for insertion in the mouth portions of filter bags to support the same from a border frame in side-by-side relation.

A number of filter bag support arrangements are known in the gas filtration art wherein mouth portions of filter bags are supported from a flow-through border frame. In application Ser. No. 817,831, filed on Apr. 21, 1969 and assigned to American Air Filter Company, Inc., on July 17, 1969, a novel filter bag support arrangement is provided which avoids the complex, time-consuming and expensive structures of past arrangements, such application providing an arrangement which fastens filter bag mouth portions to a support frame in an inexpensive, efficient manner in a minimum of time and without sealant materials. The present invention provides a modification of the mouth-shaping portion utilized in this aforementioned application to reduce the cost in forming such mouth-shaping portions and to provide a readily insertable shaping and support member which accommodates retaining edges of the mouth portions of the filter bag.

In accordance with the present invention, a structure is presented which avoids past problems in construction, mounting, sealing, wear, clamping and leakage, as well as problems in assembly and removal, the present invention providing a filter bag support structure arrangement which is straightforward and economical in construction and maintenance, allowing quick installation and removal with a minimum of leakage and a maximum of access for installation, repair and removal. In addition, the present invention provides an arrangement which permits accurate relative alignment of several filter bags in a support structure, which avoids the application of expensive sealant materials along the edge of the bag, and which assures positive retention of restraining members integral with the mouth portions of the bags.

Various other features of the present invention will become obvious to one skilled in the art upon reading the disclosure set forth herein.

More particularly, the present invention provides an improved filter bag structure comprising: at least two open-mouth filter bags, each having a flow-through rigid mouth-shaping member disposed in the open mouth portion of the bag in snug relationship therewith; and a flow-through peripheral border frame means of channel-shaped cross section to receive the opposed ends of the mouth-shaping members and the mouth portions associated therewith to support the filter bags, the border frame means being so sized relative the breadth of the mouth-shaping members that the mouth-shaping members are held in fast side-by-side relation to firmly grip the mouth portions of the filter bags therebetween, the mouth-shaping member comprising a pair of spaced parallel side bars connected together by sets of spaced transverse cross bars, the side bars each having concave-shaped cross sections with the legs of the cross section extending outwardly away from the mouth-shaping member in opposed relation, whereby adjacent mirror image side bars of adjacent mouth-shaping members form a longitudinally extending pocket therebetween to receive the mouth portions of the filter bags, the filter bag mouth portions having beaded edges to retain the mouth portions in the pockets between the mouth-shaping members.

Referring to the drawing which discloses one advantageous embodiment of the present invention:

FIG. 1 is a plan view of an improved filter bag structure of the present invention;

FIG. 2 is a cross-sectional view of the border frame only taken in a plane through line 2—2 of FIG. 1;

FIG. 3 is an enlarged side view of the novel mouth-shaping member and bag construction of the present invention;

FIG. 4 is an enlarged perspective view of a portion of the novel mouth-shaping member; and FIG. 5 is a reduced plan view of an entire mouth-shaping member.

Referring to the drawing, the novel filter structure includes a flow-through peripheral border frame 2 which can be of rectangular configuration and which, as can be seen in FIG. 2 of the drawing, is of channel-shaped cross section. Advantageously, frame 2 can be made from any one of a number of suitably rigid materials such as light gauge aluminum. At least one side of frame 2 as designated by reference number 4 can be moved aside during bag assembly operations to provide an over-all frame of U-shaped configuration for insertion of opposed ends of filter bags 5 in opposed channels of the frame so that the bags are in side-by-side relation, all as in a manner described hereinafter.

Referring to FIGS. 3 and 5 of the drawing, each of the filter bags 5 can be provided with a rigid mouth-shaping member 6 which can be made of a suitably rigid material such as aluminum. Mouth-shaping member 6 can be sized so that it can be readily disposed in an open-mouth portion of a filter bag 5 in snug relationship therewith. Once a mouth-shaping member 6 is properly disposed in the filter bag, the opposed ends of the mouth of the bag then can be inserted in the opposed U-shaped channels of opposed sides of border frame 2, the side 4 of frame 2 being set aside to permit insertion of the bag mouths. Thus the bags can be supported in side-by-side relation in border frame 2. In this connection, it is to be noted that border frame 2 is so sized relative to the breadth of mouth-shaping members 6 that the mouth-shaping members are held in fast side-by-side relation when side 4 is replaced so as to firmly grip the mouth portion of the filter bags 5 therebetween. It is to be understood, as in the previously filed application, that the filter bags 5 can be made from any one of a number of suitable filter media such as a random lay glass fiber material with a selected amount of organic binder. It further is to be understood that other types of filter media can be utilized and that the media need not be shaped in the manner disclosed, but can assume any one of several shapes well known in the art.

In accordance with the novel features of the present invention, the mouth-shaping member 6 includes a pair of spaced parallel side bars 7 connected together by sets of spaced transverse cross bars 8, the side bars each having a concave-shaped cross section with the legs of both side bar cross sections extending outwardly away from the mouth-shaping member in opposed relation, whereby, as can be seen in FIG. 3 of the drawing, adjacent side bars of adjacent mouth-shaping members form longitudinally extending pockets 9 therebetween to receive the mouth portions of filter bags 5. It is to be noted that in this regard, the filter bag mouth portions can be provided with folded and sewn edge portions 11 with a suitable binder rope 12 inserted between the folded portions to permit retention of the mouth portions of the pockets between mouth-shaping members 6.

As will be noted in FIG. 4 of the drawing and in accordance with still another feature of the present invention, mouth-shaping member 6 can be formed from a single sheet of rigid, stamped-out blank material with the longitudinal edges thereof folded in part upon themselves to form the side bars 7 of concave-shaped cross section as above described.

The invention claimed is:

1. An improved filter bag structure comprising: at least two open-mouth filter bags, each having a flow-through rigid mouth shaping member disposed in the open-mouth portion of said bag in snug relationship therewith; and a flow-through peripheral border frame means of channel-shaped cross section to receive opposed ends of each of said mouth-shaping members and the mouth portions associated therewith to support said filter bags, said border frame means being so sized relative the breadth of said mouth-shaping members that said mouth-shaping members are held in fast side-by-side relation to firmly grip the mouth portions of said filter bags therebetween, said mouth-shaping member comprising a pair of spaced parallel side bars connected together by sets of spaced transverse cross bars, said side bars each having a concave-shaped cross section with the legs of said cross sections extending outwardly away from the open mouth in opposed relation, whereby adjacent mirror-image side bars of adjacent mouth-shaping members form a longitudinally extending pocket therebetween to receive the mouth portions of said filter bags, said filter bag mouth portions having beaded edges to be retained by said mouth portions in said pocket formed between said mouth-shaping members.

2. The apparatus of claim 1, said mouth-shaping member being formed from a single blank of material with the edges thereof folded in part upon themselves to form said side bars of concave-shaped cross section.

References Cited

UNITED STATES PATENTS 3,190,059  6/1965  Bauder et al. _____ 55—499 X
3,289,394  12/1966  Young _____ 55—341

TIM R. MILES, Primary Examiner

V. GIFFORD, Assistant Examiner

U.S. Cl. X.R.

55—381, 483, 484, 509